United States Patent
Phillips et al.

(10) Patent No.: US 6,252,539 B1
(45) Date of Patent: *Jun. 26, 2001

(54) SYSTEM FOR PROCESSING WEATHER INFORMATION

(75) Inventors: Floyd Phillips, Odenton, MD (US); Ronald J. Sznaider, River Falls, WI (US); Douglas P. Chenevert, Lakeville; Peter K. Sappanos, Eagan, both of MN (US)

(73) Assignee: Kavouras, Inc., Burnsville, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,840

(22) Filed: Jul. 10, 1998

(51) Int. Cl.⁷ ....................................................... G01S 13/00
(52) U.S. Cl. ................................................................ 342/26
(58) Field of Search ....................................... 342/26, 104

(56) References Cited

U.S. PATENT DOCUMENTS

| | | |
|---|---|---|
| 4,277,845 | 7/1981 | Smith et al. . |
| 4,347,618 | 8/1982 | Kavouras et al. . |
| 4,402,672 | 9/1983 | Lowe, Jr. . |
| 4,422,037 | 12/1983 | Coleman . |
| 4,506,211 | 3/1985 | Colelman . |
| 4,521,857 | 6/1985 | Reynolds, III . |
| 4,649,388 | 3/1987 | Atlas . |
| 4,712,108 | 12/1987 | Schwab . |
| 5,111,400 | 5/1992 | Yoder . |
| 5,117,359 | 5/1992 | Eccles . |
| 5,121,430 | 6/1992 | Ganzer et al. . |
| 5,175,551 | 12/1992 | Rubin . |
| 5,208,587 | 5/1993 | Cornman . |
| 5,255,190 | 10/1993 | Sznaider . |
| 5,315,297 | 5/1994 | Cornman . |
| 5,351,045 | 9/1994 | Cornman . |
| 5,359,330 | 10/1994 | Rubin et al. . |
| 5,432,895 | 7/1995 | Myers . |
| 5,490,239 | 2/1996 | Myers . |
| 5,517,193 | 5/1996 | Allison et al. . |
| 5,583,972 | 12/1996 | Miller . |
| 5,596,332 | 1/1997 | Coles et al. . |
| 5,717,589 | 2/1998 | Baron et al. . |
| 6,125,328 | 9/2000 | Baron et al. . |

OTHER PUBLICATIONS

"Processing and Analysis Techniques Used With the NSSL Weather Radar System", Nov. 1970, Wilk and Gray, 14th Intl. Conf. on Radar Meteorology, Boston, MA, American Meterorological Society, pp. 369–374.

"Real Time Forecasting of Echo–Centroid Motion", pp. iii–79, Forsyth, Norman, OK, 1979.

An Automated Real–Time Storm Analysis and Storm Tracking Program (WEATRK), Bjerkaas & Forsyth, Environmental Research Papers, No. 715, pp. 1–115, Air Force Systems Command, Meteorology Division, Project 6670, 10/80.

(List continued on next page.)

Primary Examiner—Theodore M. Blum
(74) Attorney, Agent, or Firm—Nikolai, Mersereau & Dietz, P.A.

(57) ABSTRACT

A method for automatically generating weather alerts in disclosed. Weather related data is automatically collected and processed to detect the presence of storm cells, their location, direction and speed. Alerts are automatically generated when necessary. These alerts contain information related to the nature of the storm cell, its location, the specific geographic areas likely to be affected by the storm cell, and the storm cell's expected time of arrival at each specific geographic area.

10 Claims, 2 Drawing Sheets

OTHER PUBLICATIONS

"A Description of the Initial Set of Analysis Products Available from the NEXRAD WSR–88D System", *Bulletin of the American Meteorological Society*, vol. 74, No. 7, pp. 1293–1306, Klazura & Imy, 7/93.

"The WSR–88D and the WSR–88D Operational Support Facility", *Bulletin of the American Meteorological Society*, vol. 74, No. 9, pp. 1669–1687, Crum & Alberty, 9/93.

"TITAN: Thunderstorm Identification, Tracking, Analysis, and Nowcasting–Radar–based Methodology", Journal of Atmospheric and Oceanic Technology, vol. 10, No. 6, pp. 785–797, Dixon & Wiener, 12/93.

"Real–Time Forecasting of Echo–Centroid Motion", A thesis submitted by Douglas Forsyth, University of Oklahoma, 1979.

"Automatic Cell Detection and Tracking", IEEE Transactions on Geoscience Electronics, vol. GE–17, No. 4, pp. 250–262, 10/79.

"Automatic Identification and Tracking of Radar Echoes in Hiplex", 18th Conf. on Radar Meteorology of Am. Meteorological Soc., Atlanta, GA, Brady, et al, pp. 139–143. 3/78.

"An Automated Real–Time Storm Analysis and Storm Tracking Program (WEATRK)", Bjerkaas and Forsyth, Air Force Geophysics Laboratory, Meteorology Div., Project 6670, 10/80.

NEXRAD Doppler Radar Symposium/Workshop sponsored by the Cooperative Institute for Mesoscale Meterological Studies, Univ. of Oklahoma, pp. 1–34, 9/82.

"A Guide for Interpreting Doppler Velocity Patterns", Brown and Wood, pp. 62–82, The NEXRAD Joint System Program Office, National Severe Storms Laboratory, Norman, OK, 10/87.

"Objective Method for Analysis and Tracking of Convective Cells as Seen by Radar", *Journal of Atmospheric and Oceanic Technology*, Rosenfeld, vol. 4, pp. 422–434, 9/87.

"The NEXRAD System—Concepts and Capabilities", *NEXRAD Applications and the Media*, American Meteorological Society, Alberty and Fornear, pp. 47–57, Boulder, CO, 6/90.

"Some Wind and Instability Parameters Associated With Strong and Violent Tornadoes 1. Wind Shear and Helicity", *The Tornado: Its Structure, Dynamics, Prediction, and Hazards*, Geophysical Monograph 79, Davies, pp. 573–582, 5/90.

*On The Front*, Jun. 1996, vol. 6, No. 3, pp. 2–15.

*On The Front*, Jul. 1996, vol. 6, No. 4, pp. 2–15.

SYSTEM FOR PROCESSING WEATHER INFORMATION

BACKGROUND OF THE INVENTION

I. Field of the Invention

The present invention relates to weather forecasting and reporting. More specifically, the present invention relates to an apparatus which is capable of automatically (1) collecting and processing weather data; and (2) generating and broadcasting alerts when conditions warrant.

II. Discussion of the Prior Art

Since World War II, substantial technological advances have been made both in the field of radio and television broadcasting and in the field of weather forecasting. For many years, these two technologies have been used in tandem to provide weather information to the general public.

Today, nearly every American home is equipped with at least one radio and television. Virtually every car, truck and bus used to transport people is also equipped with a radio. As such, radio and television have become an important means by which members of the public receive local, national and world news. Weather reports are routinely broadcast over radio and television. Radio and television are also excellent tools for transmitting weather alerts when threatening weather conditions exist. Radio and television allow such alerts to be quickly and effectively broadcast to the population in a particular reception area.

Technological advances in weather forecasting have kept pace with those in radio and television broadcasting. Various radar systems, for example, have made it possible to collect important weather data over a wide area.

Despite these and other technological advances, certain problems associated with providing meaningful weather information to the general public continue to exist. For example, weather forecasting to date continues to ultimately be a human endeavor subject to human error. Weather forecasters are flooded with information that must all be analyzed and synthesized in order to assess and predict future weather conditions. This is often a difficult task, made even more difficult when conditions are threatening. Any delay in generating timely weather warnings can have severe consequences including loss of life.

Other problems arise given the vast reception areas covered by most television and radio broadcasters. Often, those located in only a small isolated portion of the broadcast area are threatened by a particular storm. Thunder, lightning, high winds and even tornadoes may be present in one portion of the broadcast area while the sky is clear and there are no impending weather threats in other portions of the broadcast area. If general warnings are broadcast too often, they tend to be ignored. Also, those paying attention have difficulty determining what weather conditions are likely to affect them and what actions should therefore be taken.

The present invention is believed to be an improvement over prior art weather forecasting and alert systems. The present invention overcomes the disadvantages associated with the prior art by automatically processing weather information and generating specific, meaningful alerts without delay.

SUMMARY OF THE INVENTION

In accordance with the present invention, there is provided an apparatus and method which facilitates the automatic collection and processing of weather data and the automatic generation and broadcast of meaningful alert messages. The apparatus comprises a digital computer which is connected to the Nexrad Information Dissemination Network operated by the National Weather Service. Via the connection, the digital computer is able to periodically receive from the National Weather Service a file known as the Combined Attribute Table. The Combined Attribute Table is a compilation of data for all storms identified by a single 1988 Doppler Weather Service Surveillance (WSR) Radar. Provided in the Combined Attribute Table for each storm are data indicative of the precise location of the centroid of the storm, the direction and speed of the storm, along with other parameters used to describe the nature and intensity of the storm cell.

The digital computer, which is the heart of the apparatus, is programmed to interpret and process the Combined Attribute Table data. For example, the computer can be programmed to establish certain pass/fail thresholds for all storms detected by radar and reported in the Combined Attribute Table. These thresholds may include values for storm intensity, speed and the probability that certain features exist within the storm. If the storm does not contain attributes which meet or exceed the programmed thresholds, the computer disregards the storm.

Alternatively, if the storm contains attributes which do meet or exceed the programmed thresholds, further processing takes place. Using data from the Combined Attribute Table related to the location, speed and direction of the storm, the computer determines the cities the storm will impact and calculates the estimated time of storm arrival at each city likely to be impacted. The computer then creates a message which can be an audio message, a test message, a graphics message, or a combined message which is then broadcast via television and/or radio. The message includes information related to the nature of the storm, the cities in the path of the storm as well as the projected arrival time of the storm at each city. All of this occurs automatically without human intervention.

DESCRIPTION OF THE DRAWINGS

The foregoing features, objects and advantages of the invention will become apparent to those skilled in the art from the following detailed description of a preferred embodiment, especially when considered in conjunction with the accompanying drawings.

DETAILED DESCRIPTION OF THE PREFERRED EMBODIMENT

Figure 1:
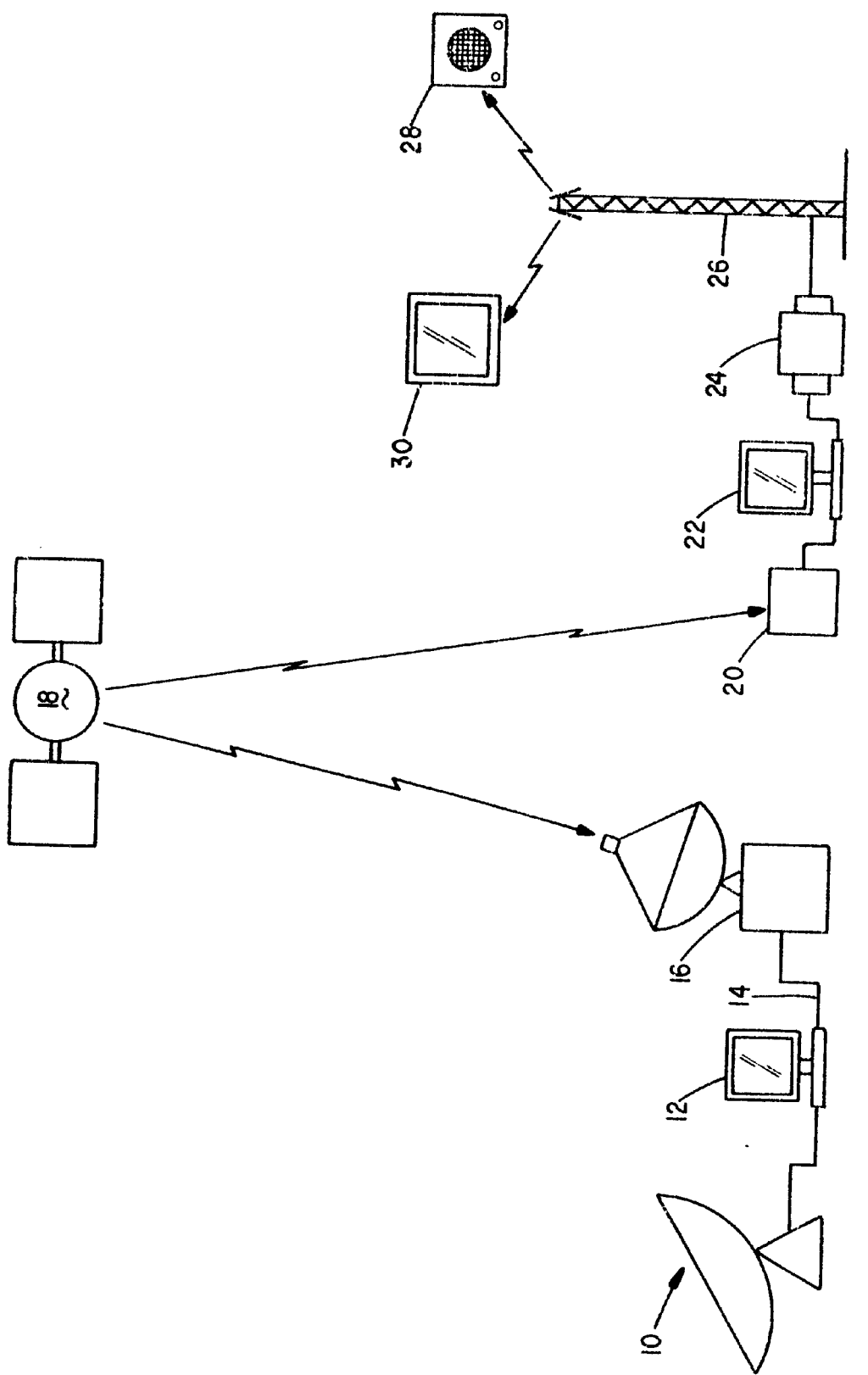
FIG. 1 is a schematic diagram of a weather forecasting and broadcast system incorporating the present invention.
Figure 2:
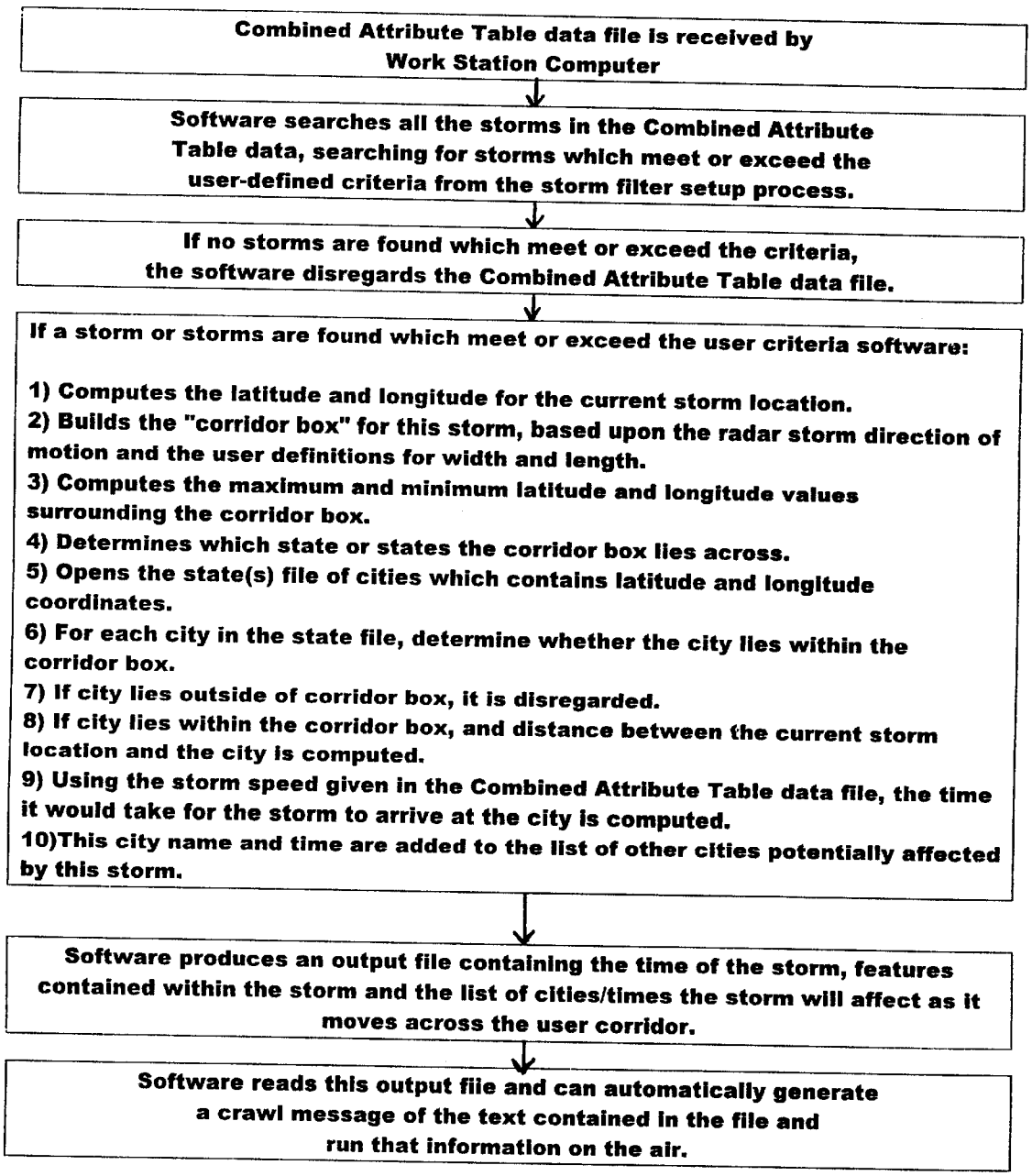
FIG. 2 is a flow chart describing one embodiment of the present invention.

One embodiment of the present invention is schematically represented in FIG. 1. The invention consists of one or more Doppler radars 10 coupled to a computer 12 operated by the National Weather Service, hereinafter referred to as the NWS computer 12. The National Weather Service also operates a network known as the Nexrad Information Dissemination Network (NIDS) represented by connection 14. Various organizations are able to receive data via NIDS 14. Those organizations, in some instances, may process the data as it is received. In other instances those organizations may use a data uplink 16 to transfer the data via satellite or other means to a remote receiver 20 coupled to work station computers 22 which reside at various remote sites. The work station computers 22 of the present invention are coupled to at least one transmitter 24 which transmits messages via an antenna 26 to radios 28 and televisions 30 within the transmitter's broadcast area.

The NWS computer 12 uses sophisticated software which interrogates the return of each radar and contains an algorithm designed to identify areas which meet the criteria necessary to define a storm cell. These criteria are established by the National Weather Service.

For each storm identified, the NWS computer calculates a precise location for the centroid of the storm. The NWS computer also calculates the direction and speed at which the storm is moving, along with several other parameters used to describe the storm's characteristics and intensity. The NWS computer also interrogates the radar return looking for the radar signatures for other significant storm features, such as hail and circulation. The NWS computer assigns either a probability or a yes-no flag for the presence of these features within the storm. The NWS computer then compiles all of the data for all of the storms it identifies and produces an output file. This file is known as a Combined Attribute Table which is transmitted via the Nexrad Information Dissemination Network 14 (NIDS). The data contained in the Combined Attribute Table can be further processed by a computer hooked into the NIDS 14. Alternatively, this data can be uplinked via a transmitter 16 and a satellite 18 to one or more receivers 20 located at remote locations. These receivers 20 are each coupled to a work station computer 22 which also process the data.

The principal advantages of the present invention are derived from the processing that occurs in the work station computers 22. Prior to use, each work station computer 22 is programmed to reflect how data contained in the Combined Attribute Table will be used. The software with which the computer 22 is programmed allows the user to set certain pass/fail thresholds for all of the radar identified storms. These thresholds may include values for storm intensity, speed, and the probability that certain features exist within the storm. If a storm does not contain the attributes the user has selected, it is disregarded by the work station computer 22. If the storm contains attributes which meet or exceed the criteria, the software with which the work station computer 22 is programmed uses data contained in the Combined Attribute Table to determine which cities the storm will impact and to calculate the estimated time of the storm's arrival at each of these cities. Users can customize the data related to city locations used in calculating such estimated arrival times. The work station computer 22 is capable of generating an output message which can be an audio message, a text message, a graphics message or a combination of any of these three types of messages. A database is provided which may be used to formulate an appropriate message. The message is then automatically conveyed to the transmitter 24 and transmitted by the transmitter 24 via antenna 26 to radios and/or televisions within the broadcast area.

FIG. 3 is a flow chart describing a manner in which the work station computer 22 processes data from the Combined Attribute Table. As indicated in the flow chart, the first step in the process is for the work station computer 22 to receive and store in its memory the data contained in the Combined Attribute Table. Next, the software program of the work station computer 22 searches all of the storms in the Combined Attribute Table, specifically looking for storms which meet or exceed the user defined criteria established during a set-up process. If no storms are found which exceed the criteria, the software disregards the Combined Attribute Table data file. If, however, one or more storms are found which meet or exceed the criteria, certain actions are performed. First, the work station computer 22 computes the latitude and longitude for the current storm location. Second, the computer determines the path of a storm by building a "corridor box" for the storm, based upon the information related to the direction of travel contained in the Combined Attribute Table and pre-programmed user definitions for width and length of the box. The corridor box represents the geographic area likely to be affected by a particular storm cell. Third, the work station computer 22 calculates the maximum and minimum latitude and longitude values surrounding the corridor box. Fourth, the work station computer 22 determines which state or states the corridor box lies across. Fifth, the work station computer 22 compares the latitude and longitude coordinates within the "corridor box" with the latitudes and longitudes of various landmarks, such as cities, listed in a pre-programmed table contained in the memory of work station computer 22. Sixth, the work station computer 22 determines whether any cities lie within the corridor box. If a city lies outside of the corridor box it is disregarded. If, on the other hand, a city lies within the corridor box, the distance between the current storm location and the city is computed. Next, using the storm direction and speed data provided by the Combined Attribute Table, the computer 22 calculates the time it will take for the storm to arrive at a particular city. The computer then builds a list of city names and arrival times for all cities potentially affected by the storm.

Once the steps outlined above are completed, the software in the work station computer 22 produces an output file containing the type of storm, features contained within the storm, a list of cities likely to be affected by the storm, and a list of predicted times at which the storm will arrive at each of the cities to be affected by the storm. The information in this output file is then inserted into or merged with a pre-programmed message which is delivered to the transmitter and broadcast to radio and television receivers.

Again, part of the set up of the software for computer 22 includes the creation of various messages that are automatically selected by the computer based upon the nature of the warning required. These preprogrammed messages can include variables that are inserted into the message by the computer 22 based upon information contained in the output file. For example, such a message template might read as follows:

"At (storm time) the National Weather Service Doppler Weather Radar has detected a storm cell with possible (storm attributes) located (initial location) moving at (storm speed). The center of the storm is projected to arrive in (city list) at (time). People located in the affected area are advised to take cover."

Based upon the output file, the computer 22 automatically inserts the calculated "storm time", the "storm attributes" (tornado, heavy winds, hail, etc.), the storm's location, the direction and speed of the storm and a list of affected cities and projected arrival times into the template. Finally, the message is automatically broadcast via the transmitter 24 and antenna 26 coupled to the work station computer 22.

With the foregoing description in mind, one can see that the present invention has numerous advantages. First, the system can be pre-programmed so that it functions automatically during times of severe weather without human intervention. Second, the system provides a near instantaneous advisory of severe weather conditions detected by Doppler radar. Third, the system generates messages that indicate the specific nature of the storm, the specific areas likely to be affected, and the specific time of storm arrival.

What is claimed is:

1. A method for automatically, and without human intervention, generating and broadcasting storm-specific weather alert messages to the general public, said method including the following steps:
   (a) receiving storm data into a computer, said storm data including at least data relating to the intensity of the storm, the location of the storm, the speed of the storm, and the direction of travel of the storm, said computer having access to a geographic database containing data related to the identity and location of each of a plurality of landmarks;
   (b) using said computer to: (i) automatically compare said storm data to a predetermined set of criteria for the purpose of determining whether a weather alert message should be generated and broadcast to the general public; (ii) automatically determine which, if any, of said plurality of landmarks are within the storm's path; (iii) for at least one of said landmarks within said storm's path, automatically calculate the predicted arrival time of the storm at said landmark; (iii) automatically create a storm-specific weather alert message by selecting a message template based upon said storm data and merging said message template with data related to the storm, data related to the identity of the landmark in the path of the storm for which the arrival time of the storm at the landmark has been calculated, and the predicted time of arrival of the storm at the landmark; and (iv) automatically broadcast said storm-specific weather alert message to the general public.

2. The method of claim 1 wherein at least some of said plurality of landmarks are cities.

3. The method of claim 1 wherein said broadcast of said storm-specific weather alert message to the general public is by television signal.

4. The method of claim 1 wherein said broadcast of said storm-specific weather alert message to the general public is by radio signal.

5. The method of claim 1 wherein said storm-specific weather alert message further includes an indication of an initial position of the storm.

6. The method of claim 5 wherein said storm-specific weather alert message further includes an indication of the speed at which the storm is moving.

7. A method for automatically, and without human intervention, generating and broadcasting weather alerts to members of the public comprising the following steps:
   (a) receiving raw weather data from at least one Doppler radar;
   (b) processing said raw weather data to (i) detect the presence of storms; and (ii) create a combined data file including data for each storm detected, said data for each storm detected comprising parameters used to describe the storm, such parameters including, but not limited to, the current location of said storm, the speed of said storm, and the vector of said storm;
   (c) disseminating said combined data file to at least one remote computer, said remote computer having access a geographic database which includes data related to the identity of landmarks and the geographic location of said landmarks;
   (d) using the remote computer to automatically compare the data related to each storm in the combined data file to a predetermined set of criteria;
   (e) for each storm meeting said predetermined set of criteria, using the remote computer to automatically determine a projected path of said storm, to automatically determine whether any of said landmarks are in the path of said storm, and to automatically determine when the storm will arrive at a landmark in the path of the storm;
   (f) using the remote computer to automatically generate at least one advisory message, said advisory message including an indication of when a landmark will be arrived by a storm meeting said predetermined set of criteria; and
   (g) automatically broadcasting an advisory message to the general public.

8. A method for automatically, and without human intervention, generating and broadcasting weather alerts to members of the general public comprising the following steps:
   (a) automatically receiving a Combined Attribute Table which includes data related to storms detected by Doppler radar, said data including, but not limited to, the intensity of each storm detected, the current location of each storm detected, the speed of each storm detected, and the vector of each storm detected;
   (b) automatically inputting said Combined Attribute Table into a computer, said computer having access to a geographic database which includes data related to the identity and location of a plurality of landmarks;
   (c) using said computer to: (i) compare the data for each storm in the Combined Attribute Table to a predetermined set of criteria; (ii) for each storm meeting said predetermined set of criteria, determine the projected path of the storm; (iii) determine which, if any, of said landmarks are in the path of the storm meeting said predetermined set of criteria; (iv) for at least one landmark in the path of the storm, determine when the storm will arrive at said at least one landmark; and (v) generate an advisory message including the identity of at least one landmark and the time of arrival of a storm at said at least landmark;
   (d) automatically broadcasting said advisory message to the general public.

9. A method for automatically, and without human intervention, generating and broadcasting weather alerts to members of the general public comprising the following steps:
   (a) automatically inputting into a computer data related to a storm, said data relating to the intensity of said storm, the current location of said storm, the speed of said storm and the vector of said storm, said computer having access to a geographical database containing data related to the identity of landmarks and the location of said landmarks;
   (b) using said computer and said data to automatically determine which, if any, of said landmarks are in the path of the storm and the arrival time of the storm at any of said landmarks within the path of the storm;
   (c) using said computer to automatically compare data related to said storm to a predetermined set of criteria; and
   (d) if said data related to said storm meets said criteria, generating and broadcasting to members of the general public, automatically and without human intervention, a weather alert, said weather alert including said anticipated arrival time of said storm at at least one of said landmarks.

10. A method for automatically, and without human intervention, generating and broadcasting weather alerts to members of the public comprising the following steps:

(a) receiving raw weather data from at least one Doppler radar;

(b) processing said raw weather data to (i) detect the presence of storms; and (ii) create a combined data file including data for each storm detected, said data for each storm detected including parameters used to describe the storm including, but not limited to, the intensity of said storm, the current location of said storm, the speed of said storm, and the vector of said storm;

(c) disseminating said combined data file to at least one remote computer; said remote computer having access to a geographic database including data related to the identity and location of landmarks;

(d) using the remote computer to automatically compare the data related to each storm in the combined data file to a predetermined set of criteria;

(e) for each storm meeting said predetermined set of criteria, using the remote computer, said combined data file, and said geographic database to automatically determine whether and, if so, when a storm will arrive at a landmark;

(f) using the remote computer to automatically generate at least one advisory message, said advisory message including an indication of the identity of a landmark and the arrival time of at least one of said storms meeting said predetermined set of criteria at said landmark; and (g) automatically broadcasting said advisory message to the general public.

\* \* \* \* \*